Dec. 27, 1955  V. C. WILSON  2,728,867
GENERATION OF POWER
Filed July 3, 1945

Witnesses:
Herbert E. Metcalf
William J. Ruano

Inventor:
Volney C. Wilson
By Robert A. Lavender
Attorney

United States Patent Office 2,728,867
Patented Dec. 27, 1955

2,728,867

GENERATION OF POWER

Volney C. Wilson, Santa Fe, N. Mex., assignor to the United States of America as represented by the United States Atomic Energy Commission Application July 3, 1945, Serial No. 603,086

22 Claims. (Cl. 310—3)

This invention relates broadly to neutronic reactors. In neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission if the reactor is made sufficiently large. In general, such reactors comprise bodies of compositions containing such fissionable material, for example natural uranium, in the form of spaced rods, spheres or other shaped bodies or enriched concentrates of fissionable isotopes in solution, slurry or the like, disposed in a neutron slowing material which slows the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656.

More specifically, this invention relates to a method and apparatus for using a neutronic reactor as a source of high voltage or electric power.

In the operation of a self-sustaining neutronic reactor, considerable energy is released as the result of the fission process. Energies of the order of 200 m. e. v. per fission are common. Of this energy, perhaps roughly 170 m. e. v. represents kinetic energy, and about 30 m. e. v. represents the energy of beta and gamma rays resulting from fission and fission products. About 7½ per cent or possibly about 10 per cent of the power developed in a neutronic reactor is in the form of beta rays.

If the neutronic reactor is one having about 50 tons of natural or enriched uranium in the form of spaced rods, and capable of developing a million kilowatts, each gram gives off about 20 watts of power. If it be assumed that each uranium rod is 4.7 square centimeters in cross section and 500 centimeters long, the volume will be about 2500 cubic centimeters. Assuming a density of 18.9, the total weight of the rod would be 48 kilograms or roughly 50,000 grams, hence the maximum available power per rod is $50,000 \times 20 = 1$ million watts. If it be assumed that $\frac{1}{10}$ of this is in the form of beta rays, then each rod gives off $10^5$ watts which is an appreciable amount of power.

An object of the present invention is to collect beta rays from a radioactive source so as to provide a source of high voltage or power.

Another object of the invention is to provide means by which a portion of the energy released in a neutronic reactor may be recovered as electrical energy.

Another object of the present invention is to provide a method and apparatus for harnessing the above described beta rays resulting from fission and fission products in a neutronic reactor so that the beta rays may be extracted directly from the neutronic reactor and the reactor will constitute a high voltage source or a source of electric power.

A more specific object of the present invention is to provide beta ray collecting means in close proximity to the fissionable bodies in a neutronic reactor so that the beta rays may be conducted externally of the neutronic reactor through terminals as electrical energy, rather than being dissipated in the form of heat energy in the reactor.

Other objects and advantages will become apparent from the following description taken with the drawings wherein.

In accordance with this invention it has been found that an effective establishment of an electric potential may be secured by means of an apparatus comprising a fissionable material and a beta ray collector electrically insulated therefrom, and at a potential which is negative with respect to the fissionable material. Upon insertion of such a device in the path of a stream of neutrons an electric potential is established between the fissionable material and the collector or collectors which may be used as a source of electric power.

Figure 1:
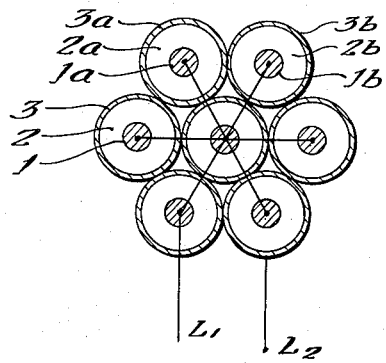
Fig. 1 is a diagrammatic cross-sectional view of some of the rod units embodying the principles of the present invention.

Referring more particularly to Fig. 1, fissionable bodies 1, 1a, 1b, etc., in the form of wires or thin cylindrical rods which may or may not be hollow, are provided in spaced relation and of any suitable length depending upon the width of the stream of neutrons or upon the practical considerations of support thereof. These fissionable bodies are surrounded by cylindrical beta collectors 3, 3a, 3b, etc. of copper, aluminum, beryllium, carbon, lead, bismuth or other suitable electrical conductor having a neutron absorption cross-section, preferably a material having a danger sum below about 50. Preferably a material which does not emit secondary neutrons to a substantial degree should be used. A space 2, 2a, 2b, etc. is provided between the collectors and the fissionable bodies serving as suitable insulation between the collector and bodies. To secure optimum insulation, this space is evacuated to a high vacuum and to effect this result the ends of the cylinders 3, 3a, etc. may be closed with electrical insulating end caps (not shown). After closing the ends they may be sealed and the cylinders evacuated.

In accordance with a further modification, insulating material such as quartz, glass, mica, polystyrene, polymerized, divinyl benzene, etc. may be disposed in the spaces 2, 2a, etc. Such insulators should have high insulating characteristics in order to withstand the high voltages which may be developed.

The cylinders 3, etc. should be relatively thin, usually just sufficient to enable capture of the beta particles. Cylinders of the order of one millimeter in thickness are suitable. Where the thinness of the beta collecting cylinder is so small that support thereof becomes a problem, a complex cylinder may be used. Such a cylinder may comprise a cylinder of an electrical insulator coated by plating, sputtering or other means with a film or coating of the beta collector.

The cylinders 3, 3a, 3b are electrically interconnected and are connected to a line terminal $L_2$. Likewise, all of the uranium rods 1, 1a, 2a are interconnected as shown and are connected to line terminal $L_1$. The insulators 2a, 2b, etc. are preferably as thin as possible to permit passage of beta rays with a minimum of energy loss but should be thick enough to be capable of withstanding the potential difference which is established. The specific thickness of the insulators, of course, depends upon the specific insulating material used and the energy of the beta rays emitted. As is well known, uranium is in itself, in the absence of neutron bombardment, an emitter of alpha particles. Thus it is obvious that the device illustrated will, prior to exposure to neutron bombardment, inherently produce a potential and current of opposite polarity to the potential and current described above, when the spaces between the rods and the cylinders are evacuated. However, the current produced by alpha particle collection will be negligibly small compared to the current produced by beta particle collection once neutron bombardment occurs. Additionally, since alpha particles are absorbed by even the smallest thickness of any solid material, alpha particle collection is suppressed when an insulating material is employed.

If it be assumed that a 2 m. e. v. beta ray or electron is emitted by the uranium rod 1 as the result of fission, a certain portion of this energy will be lost in ionization of the uranium metal in order to get out of the uranium rod, and another portion of the energy will be lost in ionization of the insulator 2, and a still further ionization loss will be in the cylindrical collector electrode 3, and the remaining energy will be used to overcome the potential difference or barrier which exists between the uranium and the collecting electrode inner wall surface due to collection of negative beta ray charges on the latter, which potential difference represents the useable voltage that can be tapped off the reactor as a source of high voltage or electric power. To give a specific example, assume that the 2 m. e. v. beta ray or electron is emitted inside the uranium rod, and that 1,000,000 volts represents the ionization loss through the uranium, 200,000 volts represents the ionization loss through the insulator and 300,000 volts represents the ionization loss in the collecting electrode, then 500,000 volts is the potential barrier, that is, the voltage which is developed and which exists between line terminals $L_1$ and $L_2$. The electrical power that is derived from line terminals $L_1$ and $L_2$ will, therefore, be in the form of a high voltage and low current, and may be used directly in many applications such as in mass spectrographs where high accelerating potentials are required or for uses for which the well-known Van de Graaff generator is employed.

If the neutronic reactor is designed primarily as a source of $94^{239}$ or for some other purpose aside from that of developing electrical power or voltage, and if it is desired to obtain a certain amount of electrical power merely as a secondary function of the neutronic reactor, this can be readily accomplished by substituting a cluster, such as represented in Fig. 1, or even a larger cluster, for one of the many uranium rods normally suspended in spaced relationship in the moderator or neutron slowing material and constituting the neutronic reactor; or several spaced groups of clusters may be substituted for several rods, one cluster for each rod, which groups of clusters may be interconnected in parallel relationship in the same manner as the units of each cluster. In order to obtain high power, the clusters should replace the uranium rods located at the center of the reactor where the neutron density is greatest.

On the other hand, if the neutronic reactor is to be designed primarily as an electrical generator of high voltage or power, then all of the uranium rods normally constituting the neutronic reactor will be replaced by a plurality of substantially equidistantly spaced clusters such as shown in Fig. 1 or perhaps clusters made up of a larger number of units. Each cluster may replace one or more uranium rods.

Various types of fissionable materials including natural uranium, pure $U^{235}$, $U^{238}$ or $94^{239}$ or mixtures of such isotopes with $U^{238}$ or $Th^{232}$, preferably mixtures containing more than 0.7 per cent by weight of fissionable isotope, may be used as the active fissioning element in the apparatus herein contemplated.

Figure 2:
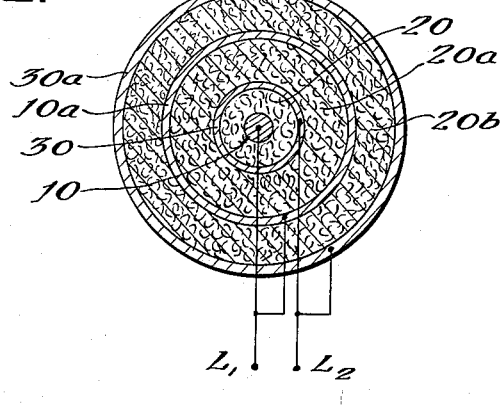
Fig. 2 is a diagrammatic cross-sectional view of a modification of the rod unit shown in Fig. 1.

Fig. 2 shows a modification of the structure illustrated in Fig. 1. A hollow, electrical conducting cylinder 30 of aluminum, carbon or the like surrounds the uranium rod 10, and a hollow uranium cylinder 10a surrounds the cylinder 30 and in turn a hollow aluminum cylinder 30a surrounds the uranium cylinder 10a; hence, alternate layers of uranium and aluminum are provided. Additional alternate layers may be provided in the device of Fig. 2 if so desired. Hollow cylinders of insulating material 20, 20a and 20b are sandwiched between these alternate layers of uranium and electrical conducting material or a high vacuum may replace the insulators. All the uranium bodies are interconnected, as shown, and lead to line terminal $L_1$, and all of the cylinders of electrical conducting material are interconnected and lead to line terminal $L_2$. With such parallel connection of elements, it will appear that for every fissionable body of uranium, there is a conducting cylinder within the range necessary for effective collection of the beta rays. While only one unit is shown which may replace one or more uranium rods in a neutronic reactor, it will be noted that a plurality of such units may be interconnected the same way; in fact, the entire neutronic reactor may be made up of a plurality of substantially equidistantly spaced units of the construction shown in Fig. 2.

Figure 3:
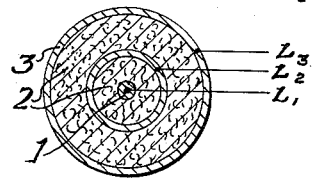
Fig. 3 is a diagrammatic cross-sectional view of a further modification of the rod unit shown in Fig. 1.

Fig. 3 illustrates a further embodiment adapted to use where the beta rays are emitted at a range of energies and where establishment of a single high potential collector is not expedient. In such a modification, the uranium rod or tube 1 may be centrally disposed within a plurality of concentric collectors 3, each of which is separated from the uranium by the space 2 which may be evacuated or occupied by an electrical insulator. The inner collector 3 should be sufficiently thin to permit collection of lower energy beta particles while permitting passage of others of higher energy to an outer collector. Two or more such concentric collectors may be provided. In such a case a potential difference will not only be established between the collectors and the uranium, but also between the various collectors. The magnitude of the potential difference between collectors will depend upon the respective energies of beta rays absorbed by the various collectors.

Figure 4:
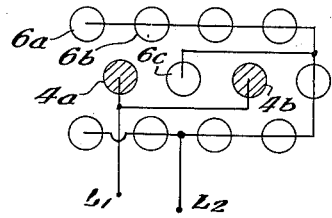
Fig. 4 is a cross-sectional view of a further modification of the rod unit suitable for use in accordance with the present invention.

Fig. 4 shows a still further modification of the structure shown in Fig. 1. A plurality of spaced rods of fissionable material 4a, 4b, etc. are substantially surrounded by collector rods 6a, 6b, 6c, etc. of electrical conducting material. All the rods are in an insulating medium or high vacuum. Rods 4a, 4b, etc. are all interconnected and lead to line terminal $L_1$, and rods 6a, 6b, 6c are connected together and lead to line terminal $L_2$. The structure shown in Fig. 4 may be expanded as much as desired to the extent of constituting the entire inner structure that is immersed in the moderator of a neutronic reactor.

Various modifications of an efficient high voltage generator have been described which may represent a portion of or the entirety of the fissionable element structure of the neutronic reactor depending upon whether a small amount of power is desired as a secondary matter in the operation of the neutronic reactor or whether the neutronic reactor is to be intended primarily as an electrical generator. The above modifications are merely by way of illustration and not limitation as to the ways the alternate spacing of fissionable material and electrical conducting material for collecting beta rays may be arranged.

While certain of the above described embodiments show parallel connection of the units, series connection thereof may be made if so desired in some cases to develop higher voltages; however, such high voltages create serious insulation problems. Likewise, while certain materials have been specifically cited as examples of suitable fissionable, insulating and collecting materials, it will be apparent that many other materials having the required properties are just as or more suitable. Furthermore, the electrical generating units described may be used in any suitable type of neutronic reactor, such as, one using heavy water as a moderator or carbon or graphite as a moderator, or other types of neutronic reactors or other high energy beta ray emitting bodies. It should be noted that while cylindrical rods of fissionable material have been described, other shapes may be used instead such as filaments, spheres, pseudospheres, cubes, or the like. It will be therefore apparent that various modifications may be made within the spirit and scope of the present invention, hence the invention should not be restricted except as set forth in the following claims.

What is claimed is:

1. In combination with a uranium body, electrical conducting means adjacent said body for collecting beta rays resulting from fission of said body and a nonionizing insulating medium permeable to beta rays separating said fissionable body and said conducting means, and a pair of electrical conductors connected, respectively, to the uranium body and the electrical conducting means to derive an electric current from the collection of beta rays.

2. In combination with a cylindrical body of uranium material, a hollow cylindrical electrically conducting body surrounding and insulated from said first mentioned body and spaced therefrom, a nonionizing insulating medium permeable to beta rays separating said cylindrical bodies and a pair of electrical conductors connected, respectively, to said bodies to conduct the collected beta rays in the form of electrical power.

3. In combination with an elongated body of uranium material, a hollow cylindrical body of electrical conducting material spaced from and closely surrounding said first mentioned body, a nonionizing insulating medium permeable to beta rays separating said elongated body and said cylindrical body, and a pair of output terminals respectively connected to said bodies to conduct collected beta rays in the form of a high voltage current.

4. In combination with an elongated body of a material containing a thermal neutron fissionable isotope selected from the group consisting of $U^{233}$, $U^{235}$ and $94^{239}$, a plurality of coaxially disposed hollow cylindrical bodies of progressively increasing diameter surrounding said first body, said cylindrical bodies being alternately bodies of material containing a thermal neutron fissionable isotope selected from the group consisting of $U^{233}$, $U^{235}$ and $94^{239}$ and electrically conducting bodies spaced substantially equidistantly from one another, a nonionizing insulating medium permeable to beta rays separating said bodies and electrical output terminals connected to said bodies.

5. In combination with an elongated body of a material containing a thermal neutron fissionable isotope selected from the group consisting of $U^{233}$, $U^{235}$ and $94^{239}$, a plurality of coaxially disposed hollow cylindrical bodies of progressively increasing diameter surrounding said first body, said cylindrical bodies being alternately bodies of material containing a thermal neutron fissionable isotope selected from the group consisting of $U^{233}$, $U^{235}$ and $94^{239}$ and electrically conducting bodies spaced substantially equidistantly from one another, electrical insulators permeable to beta rays disposed between said cylindrical bodies, and a pair of electrical power output terminals, one of which is connected to said fissionable bodies and the other connected to said electrically conducting bodies for conducting collected beta ray current.

6. In combination with a substantially cylindrical body of a material containing a thermal neutron fissionable isotope selected from the group consisting of $U^{233}$, $U^{235}$ and $94^{239}$, a plurality of coaxially disposed hollow cylindrical bodies of progressively increasing diameter surrounding said first body, said latter cylindrical bodies being alternately bodies of material containing a thermal neutron fissionable isotope selected from the group consisting of $U^{233}$, $U^{235}$ and $94^{239}$ and thin electrical conducting bodies, cylindrical insulators sandwiched between said bodies separating them substantially equidistantly and by a distance affording substantial collection of beta ray current by said electrical conducting bodies, and a pair of electrical power output terminals, said electrical conducting bodies being connected to one of said terminals, and said fissionable bodies being connected to the other of said terminals.

7. In combination, a plurality of bodies of a material containing a thermal neutron fissionable isotope selected from the group consisting of $U^{233}$, $U^{235}$ and $94^{239}$ dispersed amongst and closely spaced from a plurality of electrically conducting bodies, a nonionizing insulating medium permeable to beta rays separating said fissionable bodies from said conducting bodies, and electrical output terminals connected respectively to said fissionable bodies and to said conducting bodies for conducting electrical current resulting from said collected beta rays.

8. In combination, a plurality of spaced bodies of a material containing a thermal neutron fissionable isotope selected from the group consisting of $U^{233}$, $U^{235}$ and $94^{239}$, a plurality of electrically conducting bodies closely spaced and electrically insulated from said fissionable bodies, a nonionizing insulating medium permeable to beta rays separating said fissionable bodies from said conducting bodies, and electrical output terminals connected to said bodies.

9. In combination, a plurality of spaced bodies of a material containing a thermal neutron fissionable isotope selected from the group consisting of $U^{233}$, $U^{235}$ and $94^{239}$, a plurality of electrically conducting bodies closely spaced and electrically insulated from said fissionable bodies, a nonionizing insulating medium permeable to beta rays separating said fissionable bodies from said conducting bodies, and a pair of electrical output terminals, one of which is connected to said fissionable bodies and the other connected to said electrically conducting bodies.

10. In combination with a plurality of radioactive sources, a plurality of electrical conductors, one adjacent each source, spaced from said sources, a nonionizing insulating medium permeable to beta rays separating said sources from said conductors, a pair of electrical output terminals, said sources being connected to one of said terminals and said plurality of conductors being connected to the other of said terminals.

11. The method of generating electrical power comprising collecting on one electrode more of the beta rays emitted from a radioactive body than are collected on another electrode, and conducting the beta ray current through a pair of output line terminals.

12. The method of generating electrical power comprising effecting fission of a fissionable substance, the collecting on one electrode more of the beta rays emitted as the result of the fission process than are collected on another electrode, and conducting the beta ray current through a pair of output line terminals.

13. The method of generating voltage comprising subjecting material containing an isotope fissionable by neutrons to neutron bombardment and collecting, on an electrode separated from said fissionable material by a nonionizing insulating medium permeable to charged particles, the charged particles emitted by said fissionable material.

14. The method of utilizing a source of radioactive charged particle radiations for primarily generating electrical energy comprising collecting said charged particle radiations on a surface region adjacent to said source to establish a potential with respect to said source and deriving an electric current in response to said potential.

15. The method of utilizing a source of radioactive radiations including beta particles for primarily generating electrical energy comprising collecting said beta particles on a surface region adjacent to said source to establish in said region a voltage with respect to said source and deriving an electric current in response to said voltage.

16. The method of utilizing a plurality of sources of radioactive charged particle radiations for primarily generating high voltage electrical energy comprising separately collecting said radiations in surface regions adjacent to each of said sources to establish potentials with respect to each of said sources, combining said potentials, and deriving an electric current in response to said combined potentials.

17. Apparatus for primarily generating electrical energy including a source of radioactive material providing charged particle cold high energy emission, electrode means disposed in a region adjacent to said source for collecting said emitted particles to establish a potential with respect to said source, source connection means insulated from said electrode means, and means connected to said source connection means and to said electrode means for deriving a load current in response to said potential.

18. Apparatus for primarily generating electrical energy including an anode including a source of radioactive material providing beta-particle cold high energy emission, cathode means substantially surrounding and adjacent to said source for collecting said emitted beta-particles to establish a potential with respect to said source, source connection means insulated from said electrode means, and means connected to said source connection means and to said electrode means for deriving a load current in response to said potential.

19. Apparatus for primarily generating electrical energy including a source of radioactive material providing charged particle cold high energy emission, an electrode disposed in a region adjacent to and substantially surrounding said source for collecting said emitted particles to establish a potential with respect to said source, source connection means insulated from said electrode means, and means connected to said source connection means and to said electrode means for deriving a load current in response to said potential.

20. Apparatus for generating a plurality of electric energies including: a radioactive material providing a source of charged particle emission, a plurality of means semi-transparent to said emission disposed in regions adjacent to said source each for collecting some of said emitted particles and for transmitting others of said emitted particles to successive ones of said means to establish a plurality of potentials with respect to said source and to ground, and means for utilizing said potentials.

21. In combination with a body of a material containing a thermal neutron fissionable isotope selected from the group consisting of $U^{233}$, $U^{235}$ and $94^{239}$, electrical conducting means closely adjacent to said body for collecting beta rays at a negative voltage with respect to said body, a nonionizing insulating medium permeable to beta rays separating said body and said conducting means, and a pair of electrical conductors connected respectively to said body and said electrical conducting means to derive an electric current from the collection of beta rays.

22. In combination with a body of a material containing a thermal neutron fissionable isotope selected from the group consisting of $U^{233}$, $U^{235}$ and $94^{239}$, electrical conducting means surrounding and closely adjacent to said body for collecting beta rays resulting from fission, a nonionizing medium permeable to beta rays separating said body and said conducting means and a pair of electrical conductors connected respectively to said body and said electrical conducting means to derive an electric current from the collection of beta rays.

References Cited in the file of this patent

UNITED STATES PATENTS

| 2,206,634 | Fermi et al. | July 2, 1940 |
| 2,445,305 | Hochgesang | July 13, 1948 |

FOREIGN PATENTS

| 114,150 | Australia | May 2, 1940 |
| 861,390 | France | Oct. 28, 1940 |
| 233,011 | Switzerland | Oct. 2, 1944 |

OTHER REFERENCES

Moseley: Proc. Royal Soc. (London), A88, pages 471–476 (1913).

The Electrician, page 497 (Oct. 31, 1924).

Business Week, pages 57–64 (Sept. 1, 1945).

Goodman: "The Science and Engineering of Nuclear Power," vol. 1, pages 281–282, Addison-Wesley (1947).

Kelly et al., Phy. Rev. 73 1135–9 (1948).